June 4, 1940.  E. N. ROBINSON, JR., ET AL  2,202,869
JUSTIFYING MEANS FOR TYPEWRITERS AND OTHER MACHINES
Filed July 28, 1936  5 Sheets-Sheet 1

Inventors
Edward N. Robinson, Jr.
Harry W. Knudsen
By Thomas A. Jenkins
Attorney June 4, 1940.                 E. N. ROBINSON, JR., ET AL                    2,202,869
                   JUSTIFYING MEANS FOR TYPEWRITERS AND OTHER MACHINES
                              Filed July 28, 1936              5 Sheets-Sheet 2
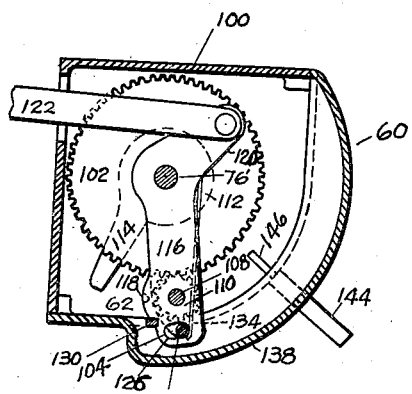
Fig. 5
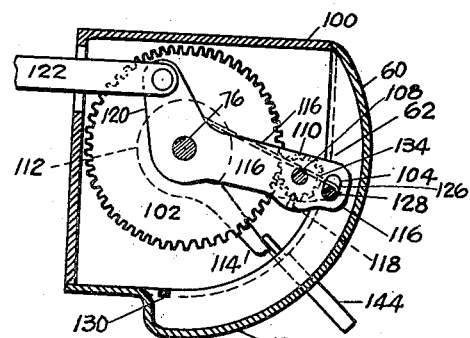
Fig. 6
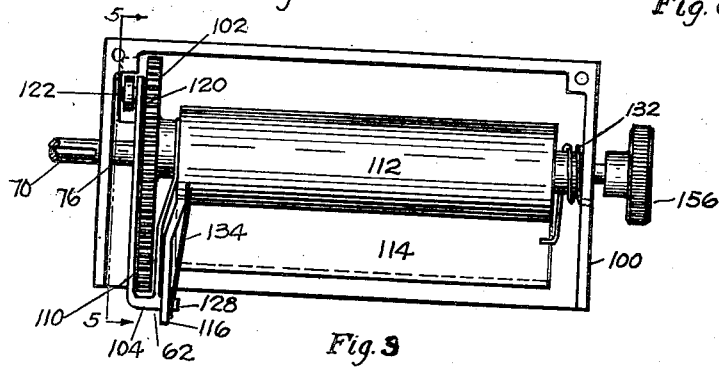
Fig. 3
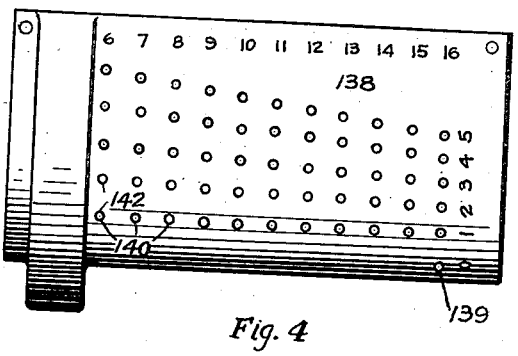
Fig. 4
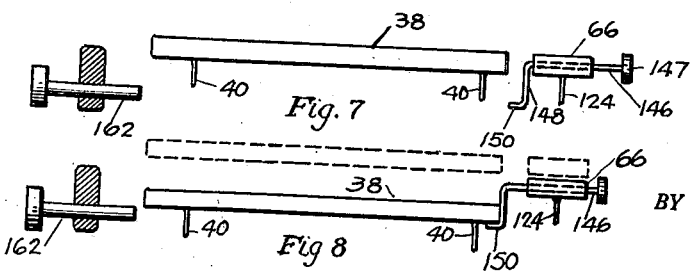
Fig. 7
Fig. 8
Edward N. Robinson, Jr.
Henry W. Kruckau
INVENTORS
BY Thomas A. Jencks
ATTORNEY Inventors
Edward N. Robinson, Jr.
Henry W. Knudsen By Thomas A. Jenkes
Attorney

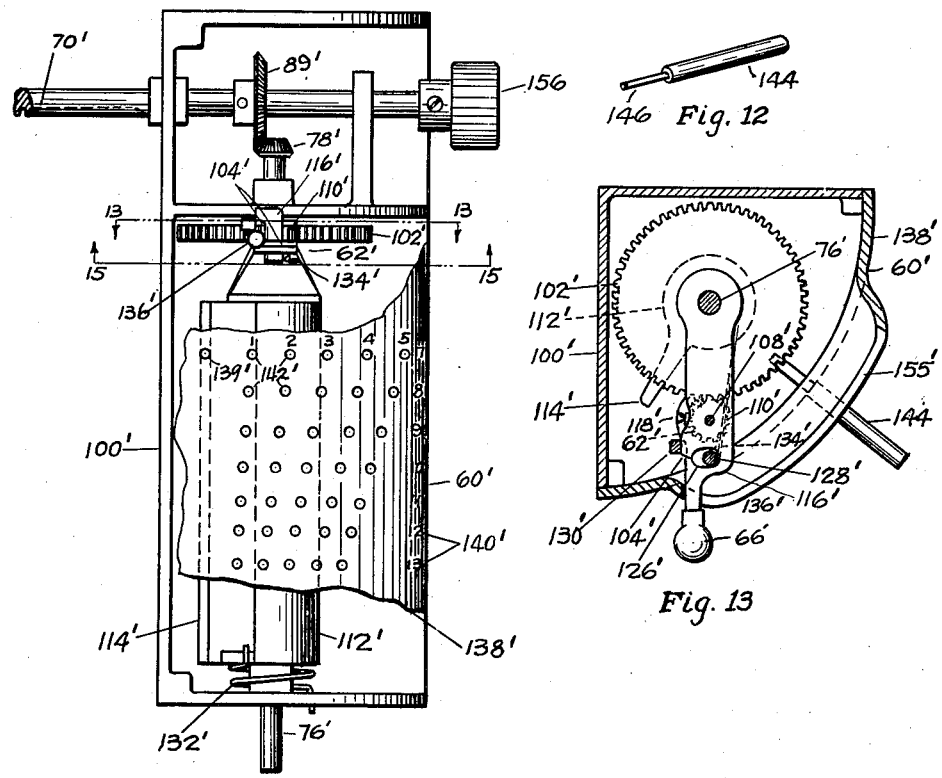
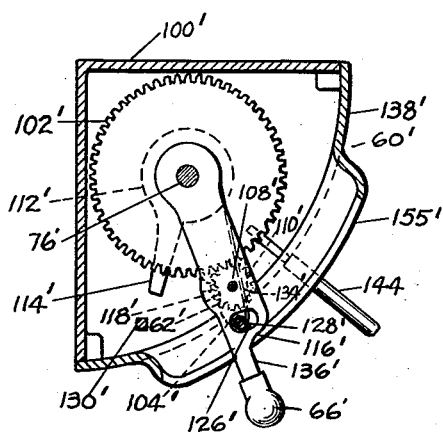
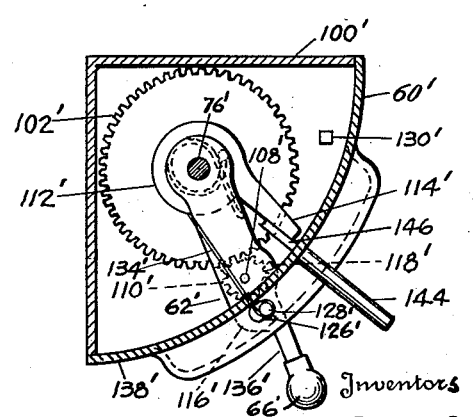

June 4, 1940. E. N. ROBINSON, JR., ET AL 2,202,869
JUSTIFYING MEANS FOR TYPEWRITERS AND OTHER MACHINES
Filed July 28, 1936 5 Sheets-Sheet 5
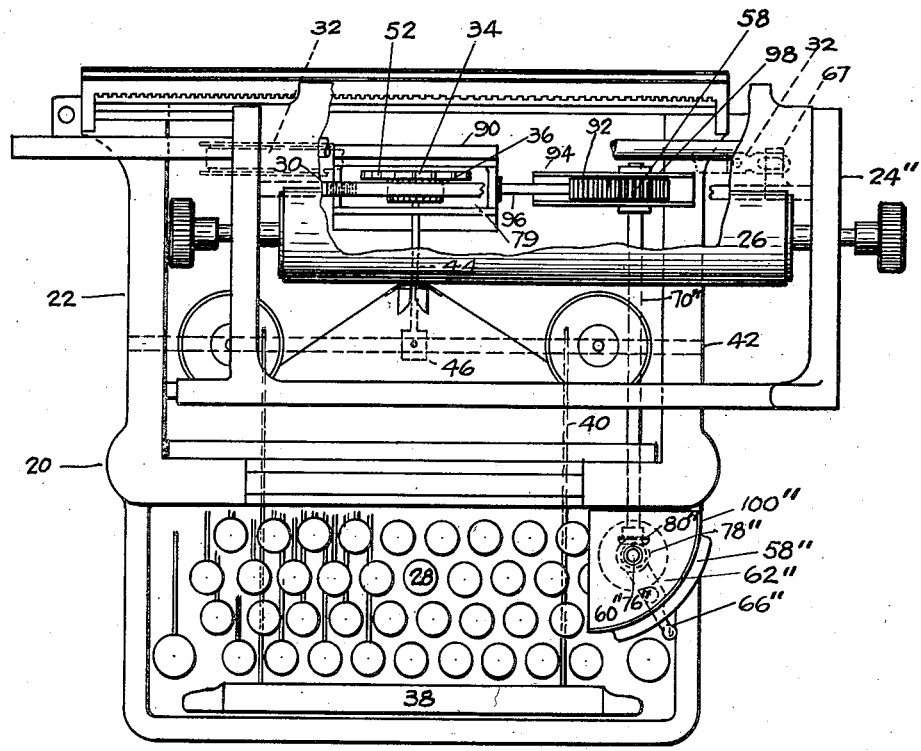
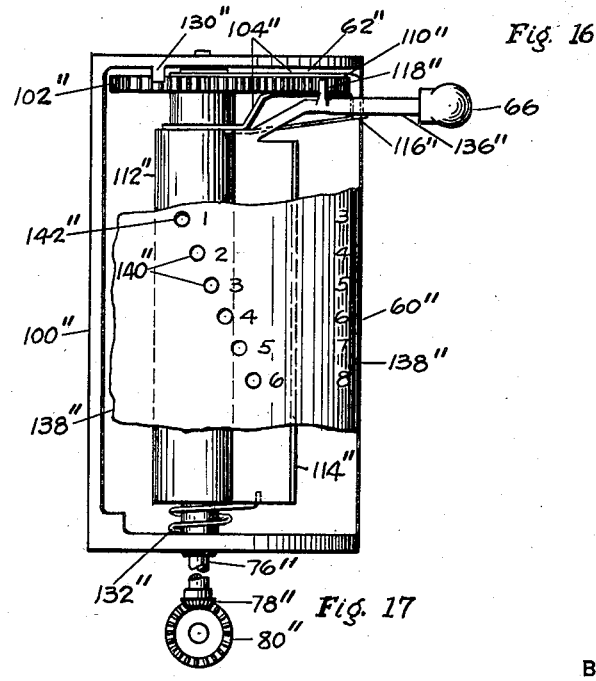
Edward N. Robinson, Jr.
Henry W. Kruebau
INVENTORS
BY Thomas A. Jenches
ATTORNEY Patented June 4, 1940

2,202,869

UNITED STATES PATENT OFFICE 2,202,869

JUSTIFYING MEANS FOR TYPEWRITERS AND OTHER MACHINES

Edward N. Robinson, Jr., and Henry W. Krukau, Providence, R. I., assignors to twenty-two per cent to Henry W. Krukau, thirty-nine per cent to Edward N. Robinson, Jr., and thirty-nine per cent to Robert S. Holding, Jr., Providence, R. I.

Application July 28, 1936, Serial No. 92,978

32 Claims. (Cl. 197—84)

Our invention relates to improvements in justifying means for typewriters and other machines, which may be either built into the entire machine or constructed as shown as a simple attachment therefor.

While we are aware that others have attempted to vary the spaces between words in a line on recopying of typewritten matter to justify the right-hand margin, so far as we are aware none of these have gone into general use on typewriters.

We believe we are the first to provide a justifying means for typewriters and like machines in which the power for moving the platen supplemental amounts between words to justify is given by the operator striking at least one word space key means and for this purpose we provide supplemental means actuated by the operator striking the word space key to cause supplemental movement of the carriage for justifying purposes and preferably so construct said supplemental means that its functioning will not interfere with the standard escapement controlled drive means mechanism, or the return movement of the carriage. The supplemental movement imparted by the supplemental means may be transmitted through the escapement mechanism to the carriage, but in our preferred embodiments is preferably transmitted directly to the carriage entirely independently of the main escapement controlled drive mechanism.

One or more supplemental space keys may, if desired, be provided for actuating said supplemental drive means, but in our preferred embodiment we preferably provide a composite unitary word space key preferably so adjusted that it will trip the escapement controlled mechanism to permit the usual main carriage drive on initial movement thereof and on a further adjustable movement thereof will advance the carriage supplemental adjustable amounts in each line for accurate justification.

In the operation of our device, an initial copy is usually first made, and as the operator in recopying comes to each line, he glances at the right-hand margin and observes the number of spaces failing to justify. He then counts the number of word spaces in this particular line, sets the setting device for accurate justification in that line in accordance with the ratio of the number of blank letter spaces by which the line fails to justify divided by the number of word spaces in the line, and then proceeds with typing the line in the usual manner. If a supplemental word space key be employed, it will be necessary for the operator to strike both the usual word space key and the supplemental word space key, but if a unitary word space key be employed, as in our preferred embodiment, it will merely be necessary for the operator to strike the single unitary word space key.

Further features of our invention relate to improvements in the specific structure of the justifying means, which is preferably provided with clutch means to permit the usual main drive movement of the carriage and the usual return movement thereof and is also preferably constructed to step up, or amplify, the leverage transmitted from the fingers of the operator to the carriage.

A further feature of our invention relates to improvements in the setting mechanism and includes the provision of means to set the justifying means for different sizes of type, by merely changing the cover of the setting mechanism.

In our preferred embodiment we preferably provide a supplemental carriage and drive the supplemental carriage by the usual escapement controlled main drive mechanism. We also mount the main carriage on the supplemental carriage so that the supplemental justifying means may move the main carriage relative to the supplemental carriage for the purposes of accurate justification, and it is thus apparent that as the clutch means is engaged only for transmitting the supplemental drive as the proper word space key is depressed, the clutch will be disengaged at all other times. We have also so connected the main carriage and the supplemental carriage that the zero return movement of the main carriage will also move the supplemental carriage to zero, the supplemental means being free to idle during this return movement, the clutch being normally released for this purpose. In our preferred embodiments, we obtain the increased leverage for supplementally moving the carriage not only by means of the leverage for mounting the space key means, but also by means of a power amplifying worm.

If the typewriter should be provided with mimeograph stencil cutting means, it is obvious that the operator can go from initial copy right into cutting the mimeograph stencil having justified lines without making an intermediate copy.

It is also apparent that if our improved justifying means be employed with a typewriter capable of variable letter spacing, it will be capable of furnishing typewritten copies analogous in appearance to printed matter, which may be used, if desired, for the purpose of making lithographs thereof, thereby dispensing with the necessity of setting up type for this purpose, and thus enabling the provision of copies simulative of printed matter without employing the expensive type composition methods or machines now generally used for this purpose.

These and such other objects of our invention as may hereinafter appear will be best understood from a description of the accompanying drawings, which illustrate various embodiments thereof.

In the drawings, Fig. 1 is a plan view of a standard make of typewriter having an embodiment of our invention attached thereto arranged to function with a unitary word space key.

Fig. 3 is an enlarged front elevation of our improved setting mechanism housing with the cover therefor removed.

Fig. 4 is a front elevation of the cover for the setting mechanism housing removed from the housing shown in Fig. 3.

Fig. 5 is a cross sectional view taken through the setting mechanism along the line 5—5 of Fig. 3 and showing the device in inoperative zero position.

Fig. 6 is a cross sectional view similar to Fig. 5 showing the supplemental means at substantially the completion of an adjusted stroke of the word space key.

Fig. 7 is a diagrammatic front elevation of the unitary type of word space key we preferably employ in idling or zero position.

Fig. 8 is a diagrammatic front elevation of the parts of our invention shown in Fig. 7 substantially at the completion of an operating stroke thereof.

Fig. 11 is a diagrammatic front view of the supplemental drive means and setting mechanism for the embodiment of our invention shown in Figs. 9 and 10 with portions of the housing cover being broken away to show the interior parts thereof.

Fig. 12 is a perspective view of the pin means we preferably employ as the setting means of our invention.

Fig. 13 is a cross sectional view taken through the supplemental means and setting mechanism housing along the line 13—13 of Fig. 11 and showing parts thereof in substantially idle position.

Fig. 14 is a cross sectional view similar to Fig. 13 showing the parts thereof in the substantially half-way position they assume on actuation of the supplemental space key.

Fig. 15 is a cross sectional view of the parts shown in Figs. 13 and 14 from the opposite side thereof along the line 15—15 of Fig. 11 showing said parts in the positions they assume substantially at the end of a set stroke of the supplemental word space key.

Fig. 16 is a plan view of a still further embodiment of our invention in which the supplemental means functions to give the carriage additive movements through the escapement mechanism.

Fig. 17 is a front elevation generally similar to Fig. 11 of the supplemental means and setting mechanism employed in the embodiment shown in Fig. 16, portions of the cover thereof being broken away to show the interior parts in elevation and showing an alternative embodiment of a housing cover which may be employed.

Figure 1:
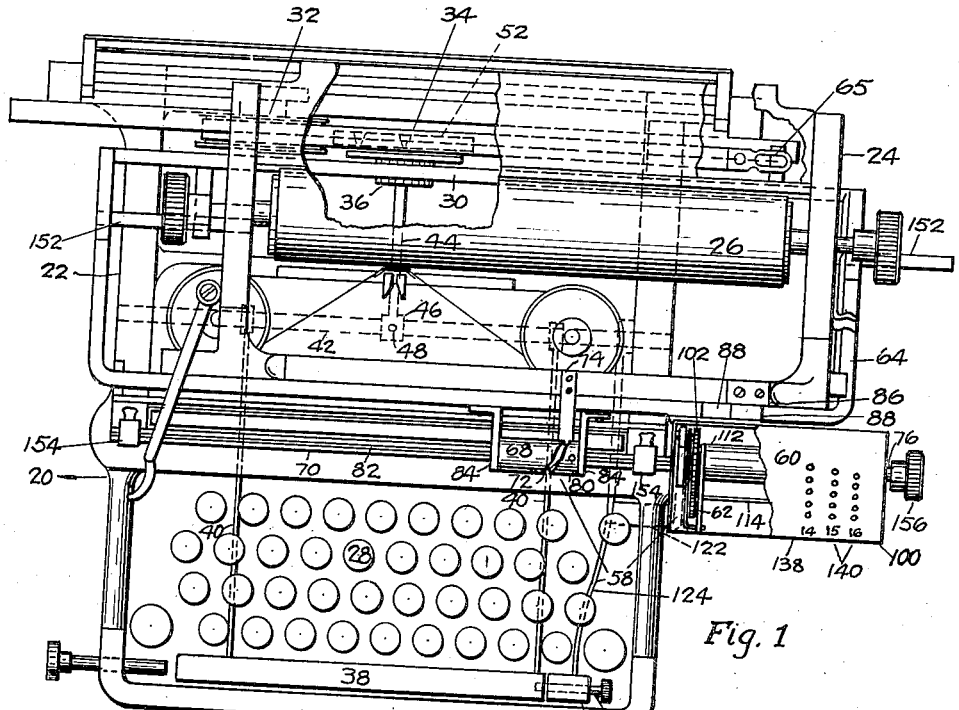
Figure 2:
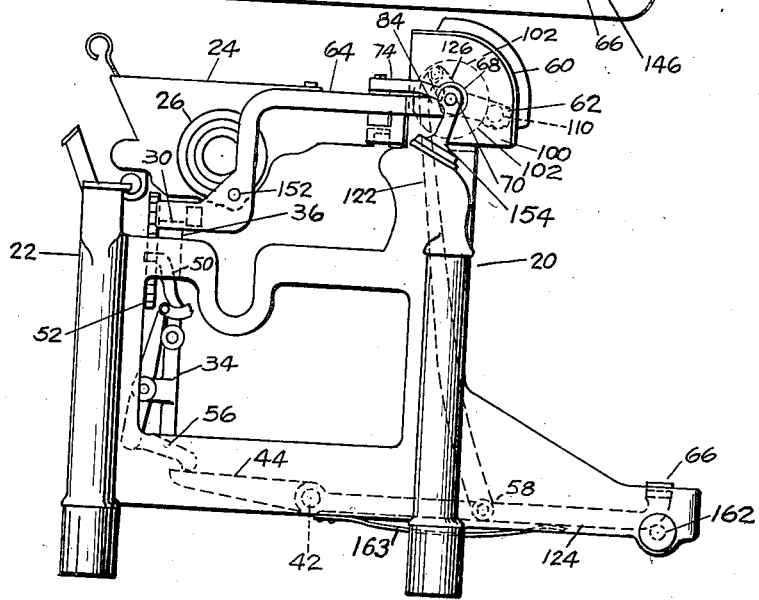
Fig. 2 is an end elevation of the embodiment of our invention shown in Fig. 1.
Figure 9:
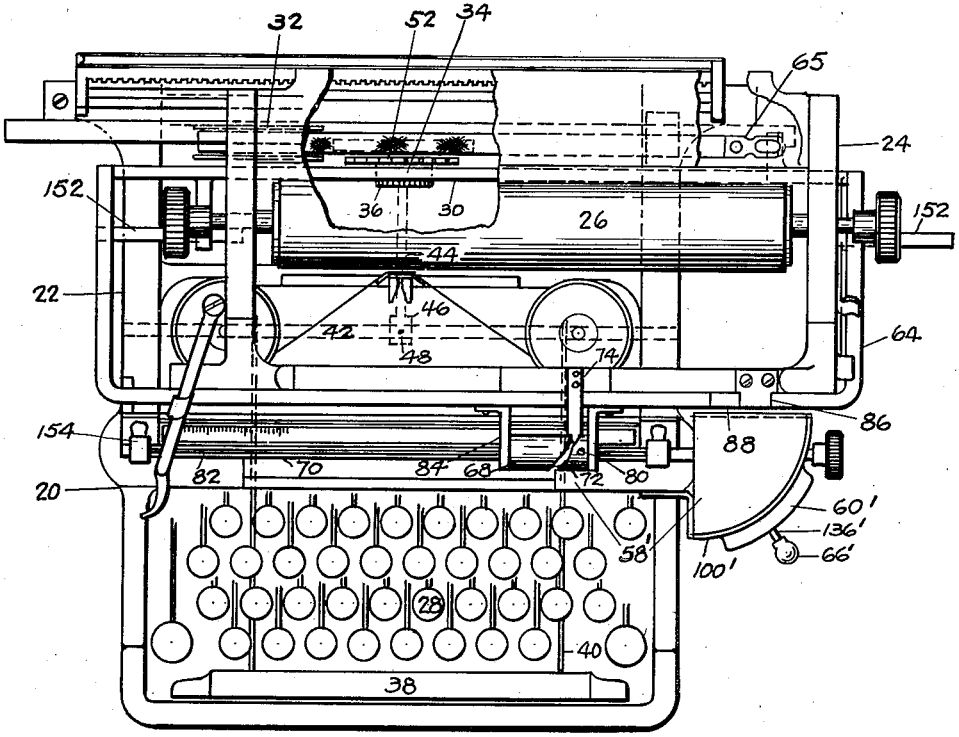
Fig. 9 is a plan view generally similar to Fig. 1 of a different embodiment of our invention employing a supplemental word space key.
Figure 10:
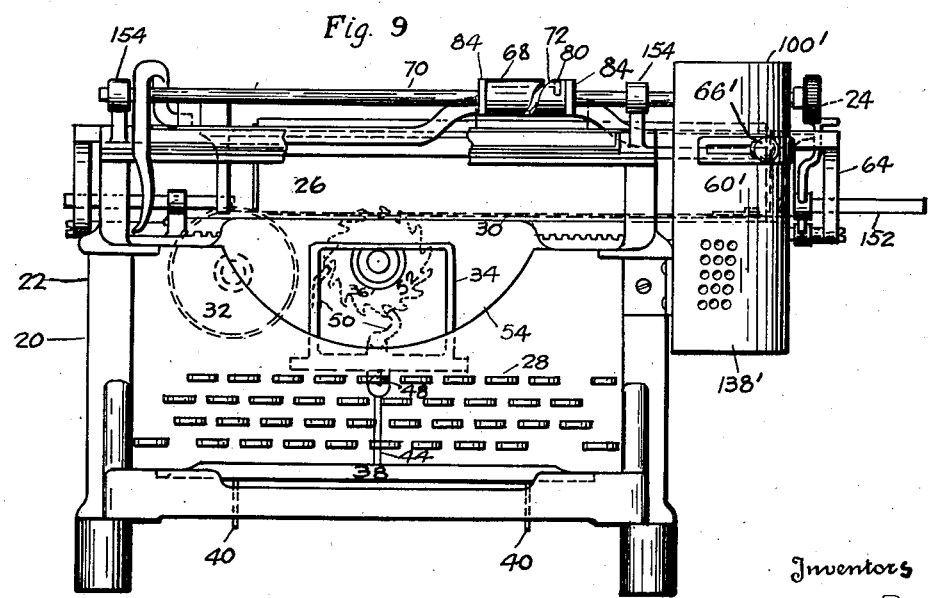
Fig. 10 is a front elevation of the embodiment of our invention shown in Fig. 9.

In the drawings, wherein like characters of reference indicate like parts throughout, 20 generally indicates a standard type of typewriter to which our invention may be conveniently attached. We have shown in Figs. 1–8 one embodiment of our invention, in Figs. 9–15 another embodiment of our invention and in Figs. 16 and 17 a third embodiment of our invention. Many parts referred to herein are standard elements of typewriters and in addition many parts of my actual invention are present in all three forms. For this reason, in general, the same elements for performing the same functions in all three embodiments, whether elements of a standard typewriter, or common elements of our invention, have the same numerals for all different embodiments and in general where the elements of our invention differ in a minor degree, analogous parts in the two modifications have been primed when referring to the embodiments shown in Figs. 9–15 and double primed when referring to the embodiment shown in Figs. 16 and 17. Where different parts have been employed in the two modifications, these have been given separate reference characters. Throughout the specification whenever we have referred to a part in general where the part performs a definite function we have referred to this part by the numeral given to it in the drawings it being understood that reference to a part in this manner also includes the modifications of the part shown in the different figures and primed as stated above. Primed numerals are used only in the specification where reference is made to a part performing a specific function in one of the modifications. Said typewriter includes the usual typewriter frame 22 and the usual carriage 24 laterally movable on said frame and normally carrying the rotatable platen 26 for carrying the paper against which the types actuated by the type keys 28 strike. The carriage 24 of a typewriter of this type usually has a toothed rack 30 carried thereby and spring means 32 having one end thereof attached to said carriage 24, however in my preferred embodiment to the supplemental carriage 64, and the other end thereof attached to the spring means mounted on said frame 22 for advancing said carriage. A standard type of escapement mechanism 34 is also preferably provided to control a pinion 36 to permit movement of said rack 30 by the spring 32 even amounts to provide uniform movement of the platen for uniform type spacing on actuation of the type keys 28. Said typewriter is also provided with a standard type of word space key bar 38. Said bar 38 is usually mounted on space bar arms 40 projecting forwardly from the space bar rocker shaft 42, which is mounted in suitable bearings in each end of the frame. The space bar rocker arm 44 projects rearwardly from said space bar rocker shaft 42 and has a collar 46 on the front end thereof mounted on said shaft 42 and provided with a set screw 48 for relative adjustment thereof on said shaft 42. The escapement 34 is provided with two pin pawls 50 to control the movement of the star wheel 52 thereof which rotates the pinion 36 to control the forward movement imparted to the carriage by the spring 32. The type bars actuate the escapement 34 to move the pin pawls 50 through the medium of a universal bar 54. The escapement 34 also has a lever 56 projecting downwardly therefrom adapted to be raised by the space bar rocker arm 44 to actuate the escapement on depression of said word space key means 38 to in turn actuate the pin pawls 50 to control the movement of the star wheel 52. It is thus obvious that as usual on actuation of the type keys 28, the type levers through the medium of the universal bar 54 will actuate the escapement 34 to move the pin pawls 50 relative to the star wheel 52 to permit the spring 32 to advance the carriage 24 uniform standard type spacing amounts and that on actuation of the word space key means 38 the space bar rocker arm 44 will actuate the arm 56 to similarly actuate the escapement 34 to move the pin pawls 50 to permit an equal movement of the star wheel 52 for uniform word spacing of similar length to the uniform type spacing through the same escapement 34 on normal actuation of the space key 38. While we have described and shown an Underwood typewriter, it is apparent that in all standard types of machines the equivalents of the parts hitherto described are employed.

As stated hitherto, our invention includes broadly the transmission of work and movement from the depression of word space keys to do the actual work of moving the carriage 24 supplemental amounts for justification, and we provide supplemental means 58 for transmitting movement of the word space keys preferably directly to the carriage 24 to cause supplemental movement of said carriage 24 for accurate justification, and said supplemental means 58 includes the justifying device 60, for control of said movement, so constructed as to function to supplementally move the carriage 24 without interfering with its main escapement controlled drive mechanism movement heretofore described or the return movement of said carriage. In said supplemental motion transmitting means 58, we preferably interpose a setting device 60 and a clutch 62. Said setting device 60 comprises means for adjusting the movement of the word space key to vary the movement imparted by said supplemental means 58 sufficient to adjust the spaces between words by amounts requisite for accurate justification. The supplemental motion transmitting means 58 is preferably so constructed as to impart the motion of the space key to the carriage with amplified leverage.

We have shown in the drawings three different embodiments of supplemental means 58 for this purpose. Figs. 1–8 illustrate our preferred embodiment employing a unitary word space key. Figs. 9–15 illustrate an alternative embodiment in which the usual escapement is employed for giving the standard word spacing on actuation of the main word space key 38 and a supplemental word space key 66 is also employed, the movement of which may be adjustably controlled and the motion of which is transmitted directly to the carriage 24 to impart the supplemental amount of movement thereto for accurate justification. In both the first and second embodiments of our invention, we provide the supplemental carriage 64 and mount the rack 30 for receiving motion from the star wheel 52 through the pinion 36 on the supplemental carriage 64, and we mount the main carriage 24 on said supplemental carriage 64 to be movable laterally relative thereto and we impart this relative lateral movement directly to the carriage 24 for the purpose of accurate justification through the medium of the supplemental means 58 controlled by movement of the supplemental word space key 66 and as the medium of amplifying the leverage in said motion transmitting means 58, we provide a worm 68 rotatably mounted on said supplemental carriage 64 and laterally slidably keyed to a grooved shaft 70 extending in front of said carriage 24, said worm being provided with a helical groove 72 for laterally moving a finger 74 projecting forwardly from the main carriage 24.

The front end of the carriage 24 is supported by the supplemental carriage 64 and particularly by the point of the finger 74 thereof fitting into the groove 72 of the worm 68. The grooved shaft 70 is mounted on suitable brackets 154 projecting forwardly from the frame.

Suitable bars 152 are provided to project laterally from the main carriage 24 to be laterally slidable through suitable holes in the ends of the supplemental carriage for the additional support of said main carriage.

The setting mechanism 60 is suitably mounted on an extension shaft 76 of the same grooved shaft 70 as shown in Figs. 1–8, or if desired, as shown in Fig. 11, a shaft 76' corresponding to shaft 76, shaft 76' being a vertically mounted shaft having a bevel gear 78' on the upper end thereof engaging a bevel gear 89' on the grooved shaft 70' for imparting motion thereto. In the embodiment shown in Figs. 1–8, the supplemental space key 66 is so joined to the main space key 38 as to function as a unit in combination therewith. It is apparent that in each embodiment shown in Figs. 1–15, the supplemental means 58 functions to transmit its movement directly to the carriage 24 and in association with the clutch 62 entirely independently of the main escapement controlled drive mechanism. In the embodiments of our invention shown in Figs. 1–15, the end of the spring means 32 is attached to the supplemental carriage 64 as at 65 instead of to the main carriage 24 as shown at 67 in Fig. 16, and it is apparent that the escapement mechanism 34 functions to permit the controlled movements of the supplemental carriage 64 in response to actuation of the type keys 28 and word space key 38 as usual. The carriage 24 is supported by the supplemental carriage 64 as explained, and while receiving its lateral movement, the worm 68 slides along the grooved shaft 70 while the usual escapement controlled movement is transmitted as just explained to the supplemental carriage 64 and hence to the main carriage 24 supported thereby.

We have shown in Figs. 16 and 17, however, an embodiment of our invention in which the carriage 24" is mounted as usual directly on the frame 22 and in which the escapement 34 is mounted on a laterally slidable support 79, which in turn is moved laterally by the supplemental means 56" actuated by the supplemental word space key 66" adjustable amounts for accurate justification.

While two word space keys 38 and 66' or 66" may be employed as in the embodiment shown in Figs. 9–17, we prefer the embodiment shown in Figs. 1–8 in which the keys are combined to function as a unit on one stroke by the operator.

In the embodiments shown in Figs. 1–15, the worm 68 is provided with a hollow core for mounting on said shaft 70 and has a pin or key 80 projecting radially inwardly thereof adapted to slide in the groove 82 of the grooved shaft 70. The point of the finger 74 substantially fills up the groove 72 to provide positive actuation of the carriage 24 without back lash in either direction and the groove 72 is of such a pitch, preferably around 45°, as to not only be readily reversible for the return movement of the carriage 24, but also of a relatively slow pitch to provide the amplified leverage for the transmission of the movement of the supplemental means 58 from the word space key means to the carriage 24. The supplemental carriage 64 is provided with the brackets 84 projecting forwardly therefrom for mounting of the worm therebetween and to confine the ends of the worm to cause it to move over the grooved shaft 70 simultaneously therewith. Suitable stop means 86 are provided on the carriage 24 to function in association with cooperating stop means 88 on the supplemental carriage 64 to return said supplemental carriage 64 and worm 68 to initial position on lateral return movement of said carriage 24, in the preferred embodiment shown comprising a lug 86 projecting forwardly from the carriage 24 into a laterally extending channel 88 in the front portion of the supplemental carriage 64 of a total width sufficient to permit the total desired advancement of the main carriage 24 relative to the supplemental carriage 64 and it is obvious that as the carriage 24 is moved to its return position by the operator that the stop lug 86 thereon abutting the edge of the groove 88 will simultaneously function to move the supplemental carriage 64 and worm 68 to their initial starting position, the worm 68 rotating freely to permit the finger 74 to move it to its relative zero position.

In the embodiment shown in Figs. 16 and 17, the escapement support 79 is laterally slidably mounted on the slideway 90 and a rack 92 is also laterally slidably mounted on a supplemental slideway 94 in alignment therewith joined to said support 79 by means of the connecting rod 96, both of said aligned slideways 90 and 94 being located near the rear of the frame substantially below the escapement, and either the space bar rocker arm 44 or the escapement lever 56 being made of sufficient width to permit the desired relative movement, the spring 30 readily providing the slight extra necessary movement desired. In addition, in place of employing the universal bar 54 to be contacted by the type keys to actuate the escapement, it will be apparent to one skilled in the art that a straight bar for this purpose, as employed on a Remington Noiseless machine, or its equivalent should be employed. In this embodiment, the shaft 70" projects forwardly from said rack 92 and has a pinion 98 at the rear end thereof in mesh with said rack 92. In the embodiment shown in Figs. 16 and 17, the other portions of the motion transmitting means 58" including the setting device 60" and the clutch 62" are generally similar to those shown in the other embodiments and which will now be described.

In each embodiment shown, the setting device 60 and releasable clutch 62 are mounted in the housing 100 including the extension 76, or shaft 76' or 76" corresponding thereto heretofore referred to. As stated hitherto, a releasable clutch 62 is provided, which is normally disengaged during all the main drive mechanism movements and zero return movements, but which only becomes engaged when a word space key 66 is moved. While any suitable type of clutch means may be provided for this purpose, we preferably construct it as follows in all embodiments. As stated hitherto, the extension shaft 76, 76' or 76" is suitably mounted in bearings in the opposite ends of a generally rectangular shaped housing 100. A relatively large gear 102 is rigidly mounted on said shaft near the inner end thereof in the embodiment shown in Figs. 1-8, and on the upper end thereof as shown in the other embodiments. Inasmuch as the setting mechanism and clutch mechanism are substantially the same for all embodiments, despite what relative positions they may assume, we will first describe these mechanisms as shown in Figs. 1-8 and then state in what respects the mechanisms shown in the other embodiments differ. We also loosely mount suitable bracket means 104 on said shaft, preferably comprising a U-shaped bracket 104 having collars on each U-leg thereof for receiving said shaft 76 and a U-base straddling said large gear 102. The outer ends of said U-legs are provided with suitable holes for receiving a stub shaft 108 mounting the pinion 110 which meshes with said large gear 102 and relatively rotatable circumferentially thereover on relative rotation of said bracket 104 relative to the large gear 102. We loosely independently mount a sleeve 112 around shaft 76. Said sleeve is preferably provided with fin means 114 projecting radially therefrom in a plane passing through the axis of the sleeve and extending substantially the length of said sleeve through said housing in the preferred embodiment comprising the continuous fin 114. We also provide arm means 116 projecting integrally from said sleeve provided with projection 118 projecting axially therefrom adapted, on relative movement of said arm means and sleeve relative to said bracket 104, to engage in a tooth of said pinion 110. Further rotative movement of said arm means and sleeve about shaft 76 causes said pinion to tend to rotate circumferentially on said large gear, but due to pinion being locked and having the teeth thereof in mesh with said gear teeth causes rotative movement of said large gear 102 and shaft 76. Suitable means are provided to pivot said arm 116 on depression of said supplemental space key 66, in the embodiment shown in Figs. 1-8, said means comprising an extension 120 from said arm 116 having the connecting link 122 actuated by the space key arm 124 on depression of the space key 66 to cause relative movement of said arm 116 on said shaft 76. Said arm 116 is also provided with a circumferential slot 126 adapted to receive a projection 128 projecting laterally from said bracket means 104. Suitable stop means 130 are provided adapted to abut said bracket 104 as it returns to zero position to insure disengagement of the projection 118 from the pinion 110 as it nears its zero position. We also provide a helical spring means 132 having one end thereof mounted in the housing wall, the body thereof surrounding the shaft 76 and the other end thereof abutting the fin means 114 to normally urge said sleeve 112, arm 116 and projection 118 to zero position out of engagement with said pinion 110, the end of the slot 126 in said arm 116 abutting said projection 128 to simultaneously drag and return the bracket 104 to zero position, the pinion 110 then free of the pawl 118 and thus free to freely rotate over the large gear 102 being carried with it. It is apparent that as said projection 128 from said bracket 104 nears its zero position said bracket 104 will abut the stop means 130 to permit said spring means 132 to return said sleeve, arm and projection 118 to zero position substantially at the end of the zero return movement of the arm 114 to continuously insure independent rotation of said large gear shaft 76 and pinion 110 on return of the carriage 24. We also provide spring means 134 mounted on the arm 116 to resiliently continuously abut said projection 128 to move said bracket 104 relative to said arm 116 to cause immediate registration of said projection 118 in said pinion 110 on movement of the arm 116 from zero position.

In the embodiment shown in Figs. 9–17, the arm 116' or 116" is provided with an extension 136' or 136" on which the supplemental space key means 66' or 66" is mounted.

We also provide a substantially quadrant-shaped cover 138 for said housing 100 having sets 140 of pin receiving hole setting means 142 thereon. The holes 142 in each set 140 are circumferentially aligned relative to the shaft 76 and are each individually spaced from each other equal amounts proportionate to successive integral fractions of spaces needed to justify and the size of type employed. Said sets 140 are spaced from each other axially of said shaft 76 and each set successively comprises fractions of successive numbers of spaces needed to justify. We have found out in practice that a line rarely fails to justify by more than five spaces and thus each set 140 is divided into five holes corresponding to the desired numerators or the number of blank letter spaces by which the line fails to justify, and each set from right to left comprises the desired denominators or the word spaces in the line to which the desired fractions of the blank letter space may be added. We have found in practice that practically all lines contain from six to sixteen word spaces, and in most normal lines it is necessary to make up only five blank letter spaces. Thus the first set 140 comprises six word spaces in the line and to make up the 1, 2, 3, 4 or 5 blank letter spaces needed to justify in said word spaces, it is necessary to add a fraction of a word space to each normal word space. Thus if it is only desired to add one space, it will be necessary to add one-sixth of a space to each word space in a line and that the lower left hand pin hole 142 be employed. Thus in the first set 140 we provide holes at ⅙, ⅖, ⅜, ⅘ and ⅚ respectively to make up the desired number of word spaces at the end of the line and so on for successive fractions in each set.

We also provide pin means 144 having a point 146 detachably insertable within a selected hole 142 to abut the fin means 114 to limit the extent of the possible pivotal movement of the supplemental space key 66 on each actuation thereof to add the proper amounts for proper justification. Supposing there were 16 word spaces in a line, the set 140 at the right would therefore comprise 1/16, 2/16, 3/16, 4/16 and 5/16.

The setting mechanism in the second embodiment shown in Figs. 9–15 is exactly analogous. We have found out in practice, however, that instead of adding spaces between each word, it might be possible to add the entire justification spaces between either two words or between a plurality of words substantially less than the total number of words in the line. Thus we have shown in Fig. 17 one hole 142" only for each set 140" to add the fractions. Thus in the example shown, if there are up to five spaces to make up, the pin means 144" is inserted in the selected hole 142", the first hole in this instance being thirds and the supplemental space key 66" must be actuated three times in a line to make up three thirds or one blank letter space in the line to justify. We preferably employ, however, the embodiment shown in Figs. 1–15, which actually adds the desired increment between each word in the line to justify and which can be made fully automatic in a manner to be explained, to be actuated by one movement only of a single space key means.

As shown in Figs. 7 and 8, the supplemental space key 66 is arranged to the right of the word space key bar 38, and is provided with the connecting plunger 146 slidable laterally therein and having an end 148 laterally slidable to underlie the word space key bar 38 having the projection 150 adapted to be contacted by the word space key bar 38 after a definite downward movement thereof. In this instance the collar 46 on the space bar rocker arm 44 is adjusted to cause initial movement of the space key bar 38 to actuate the space bar rocker arm 44 to lift the arm 56 to trip the escapement for the usual escapement controlled word spacing on the initial pivotal movement of the word space key bar 38. It is apparent that further lowering of the word space key bar 38 will cause it to abut the projection 150 to simultaneously lower after the predetermined movement for initially actuating the escapement, the supplemental space key means 66, which will then on further downward movement of said space key bar 38, through the arm 124, link 122 and extension 120 of the arm 116 cause rotative movement of the arm 116 until the projection 118 is engaged within the pinion 110 when, on further movement of the arm 116 it will cause the pinion 110 to positively engage the large gear 102 to rotate the shaft 76 until the fin means 114 abuts the pin point 146 inserted in the selected hole 142 for accurate justification, the end of the slot 126 abutting the projection 128 causing simultaneous movement of the bracket 104 with the arm 116. It is thus obvious that on each successive actuation of the space key 38 the escapement mechanism will function to add a normal word space and the supplemental means 58 will also function to add supplemental amounts in each word space for accurate justification, the arm 116 successively rotating until the fin means 114 contacts the pin end 146 to add such successive equal increments throughout the line on successive actuations of the space key 38. It is obvious that when pressure is removed from the space bar 38, the spring 163 mounted below the arm 124 will function to raise the arm 124 and link 122 and extension 120 of the arm 116, the spring 132 functioning on return movement of said arm to rotate the sleeve 112, arm 116 and bracket 104 after the projection 128 has struck the opposite end of said slot 126, carrying the pinion 110 to zero position. Just prior to the return of the bracket 104 to zero position, the stop 130 will abut it and the spring 132 will then function to move the arm 116 further, the projection 128 sliding in the slot 126 for this purpose and the projection 118 being lifted out of contact with the pinion 110 by the movement of the arm 116.

It is apparent that the embodiments of the invention shown in Figs. 9–17 function in similar fashion to the embodiment hitherto described. In the embodiment shown in Figs. 9–15, the supplemental space key 66' as stated is mounted on the end of the arm 116' to function in a suitable circumferential slot 155' therefor in the cover 138' and thus functions entirely independently of the main space key 38 and the main escapement controlled drive mechanism, it being necessary to supplementally move the supplemental space key 66' for this purpose, in the embodiment shown in Figs. 9-15, after each striking of the word space key bar 38 for normal word spaces between each word in the line and also in the embodiment shown in Figs. 16 and 17 the desired number of times in the line. While the shaft 70 and its extension 76 in the embodiment shown in Figs. 9-17 comprise two separate shafts 70' or 70'' and 76' or 76'' meshing through the medium of the bevel gears 78' or 78'' and 89' or 80'' at right angles to each other, it is obvious that otherwise the setting mechanism 60' or 60'' and releasable clutch means 62' or 62'' function in identical fashion to that explained for the embodiment shown in Figs. 1-8. If desired, in place of employing the connections between the supplemental space key 66 and main space key bar 38 shown in Figs. 1 and 2 and 7 and 8, the arm 116 shown therein may be provided with the extension 136' or 136'' for receiving the supplemental space key 66' or 66'' thereon and it is also apparent that the embodiments shown in Figs. 9-17 may be similarly connected to function from one unitary composite space key.

As stated hitherto, if desired to change the size of the type in the typewriter, our improved attachment may be made to function in cooperation with said changed type on the typewriter by the mere substitution of another cover 138 having the holes 142 differently spaced thereon. In all embodiments shown, the end of the shaft 70 may be provided with a knob 156 for rotating said shaft 70 to move said worm 68 and connected carriage 24 backwards any amount for correction purposes. This knob 156 is particularly desirable to return the rack 92 and connected escapement support 79 and escapement to zero position when desired, in structures similar to that shown in Figs. 16 and 17.

While we have shown a setting device comprising sets of holes and pin means insertable within a selected hole, it is apparent that any type of setting device having a projection adapted to be selectively located to abut the fin means 114 on the desired movement thereof for accurate justification may be employed. It will be noted that the cover 138 is provided with a zero hole 139 near the lower end thereof and that when employing our improved invention for a line which justifies itself leaving no blank spaces at the end of the line, the pin means 144 must be inserted within said zero hole 139 to prevent any movement of the supplemental means 58. When it is desired to use a tyewriter for ordinary unjustified typewriting, it is obvious that the plunger 146 may be withdrawn, removing the projection 150 free of the main space bar 38, in which case the insertable stop 162 may be inserted underneath the main space bar 38 to limit the downward pivotal movement thereof just sufficient to actuate the escapement.

As stated hitherto, in place of the attachment for standard types of typewriters shown, our improved invention may be constructed as a unitary part of a standard typewriter. It is also obvious that various features thereof including the specific type of clutch and setting mechanism shown may be used in other machines. When used as a justifying attachment for standard types of typewriters, however, it is apparent that we have provided a construction which may readily be added thereto with slight changes therein quickly and at a relatively small cost.

It is apparent, therefore, that we have provided a novel type of justifying means for typewriters and other machines with the advantages set forth in detail above.

It is understood that our invention is not limited to the specific embodiments shown and that various deviations may be made therefrom without departing from the spirit and scope of the appended claims.

What we claim is:

1. In combination with a typewriter having a carriage, type keys, word space key means and a uniformly operable escapement controlled main drive mechanism for said carriage providing uniform type spacing on actuation of the type keys and uniform word spacing on actuation of the word space key means, supplemental means for transmitting movement of said word space key means directly to said carriage to cause supplemental movement of the carriage without interfering with its main escapement controlled drive mechanism movement and zero return movement and means for adjusting the movement of said space key means to vary the movement imparted by said supplemental means to adjust the spaces between words by supplemental amounts for accurate justification.

2. In combination with a typewriter having a carriage, type keys, at least one word space key and a uniformly operable escapement controlled main drive mechanism for said carriage providing uniform type spacing on actuation of the type keys and uniform word spacing on actuation of a word space key, supplemental means for transmitting movement of said word space key to cause supplemental movement of the carriage without interfering with its main escapement controlled drive mechanism movement and zero return movement and means for adjusting the movement of said last-mentioned word space key to vary the movement imparted by said supplemental means to adjust the spaces between words by supplemental amounts for accurate justification.

3. In combination with a typewriter having a carriage, type keys, a word space key and a uniformly operable escapement controlled main drive mechanism for said carriage providing uniform type spacing on actuation of the type keys and uniform word spacing on actuation of the word space key means, a supplemental word space key, means for transmitting a single movement of said supplemental word space key only between each word directly to said carriage to cause movement of the carriage without interfering with its main escapement controlled drive mechanism movement and zero return movement and means for adjusting the movement of said supplemental space key at the beginning of each line to vary the movement imparted by said single movement of said single supplemental space key by supplemental amounts to provide uniform spaces between words for accurate justification of each line.

4. In combination with a typewriter having a carriage, type keys, a word space key and a uniformly operable escapement controlled main drive mechanism for said carriage providing uniform type spacing on actuation of the type keys and uniform word spacing on actuation of the word space key, a supplemental word space key, means for transmitting a single movement of said supplemental word space key only between each word to cause movement of the carriage without interfering with its main escapement controlled drive mechanism movement and zero return movement and means for adjusting the movement of said supplemental space key means at the beginning of each line to vary the movement imparted by said single movement of said single supplemental space key by supplemental amounts to provide uniform spaces between words for accurate justification of each line.

5. In combination with a typewriter having a carriage, type keys, a single unitary word space key and a uniformly operable escapement controlled main drive mechanism for said carriage providing uniform type spacing on actuation of the type keys and uniform word spacing on actuation of the word space key, supplemental means for transmitting movement of said word space key to cause supplemental movement of the carriage without interfering with its main escapement controlled drive mechanism movement and zero return movement and means for adjusting the movement of said single unitary word space key to vary the movement imparted by said supplemental means to adjust the spaces between words by supplemental amounts for accurate justification.

6. In combination with a typewriter having a carriage, type keys, a single unitary pivotally mounted word space key and a uniformly operable escapement controlled main drive mechanism for said carriage providing uniform type spacing on actuation of the type keys and uniform word spacing on initial actuation of the single unitary word space key, supplemental means for transmitting further movement of said word space key means to cause supplemental movement of the carriage without interfering with its main escapement controlled drive mechanism movement and zero return movement and means for adjusting the movement of said single unitary word space key to vary the movement imparted by said supplemental means to adjust the spaces between words by supplemental amounts for accurate justification.

7. In combination with a typewriter having a carriage, type keys, pivotally mounted word space key means and a uniformly operable escapement controlled main drive mechanism for said carriage providing uniform type spacing on actuation of the type keys and uniform word spacing on initial actuation of the word space key means, supplemental means for transmitting further movement of said word space key means to cause supplemental movement of the carriage normally permitting the main escapement controlled drive mechanism movement and zero return movement, clutch means actuated by said further movement of said space key means to engage said supplemental motion transmitting means to impart compensating movement to said carriage to adjust the spaces between words by supplemental amounts for accurate justification and means for adjusting the movement of said supplemental space key means.

8. In combination with a typewriter having a carriage, type keys, at least one word space key and a uniformly operable escapement controlled main drive mechanism for said carriage providing uniform type spacing on actuation of the type keys and uniform word spacing on actuation of a word space key, supplemental means for transmitting movement of a word space key with amplified leverage to cause supplemental movement of the carriage without interfering with its main escapement controlled drive mechanism movement and zero return movement and means for adjusting the movement of said last-mentioned word space key to vary the movement imparted by said supplemental means to adjust the spaces between words by supplemental amounts for accurate justification.

9. In combination with a typewriter having a carriage, type keys, pivotally mounted primary word space key means and a uniformly operable escapement controlled main drive mechanism for said carriage providing uniform type spacing on actuation of the type keys and uniform word spacing on initial actuation of the word space key means, supplemental pivotally mounted word space key means, means for transmitting movement of said supplemental word space key means to cause supplemental movement of the carriage, clutch means actuated by said movement of said supplemental space key means to engage said motion transmitting means to impart compensating movement to said carriage to adjust the spaces between words by supplemental amounts for accurate justification, means for adjusting the movement of said supplemental space key means, and means to detachably connect said pivotally mounted supplemental word space key means to said pivotally mounted primary word space key means to cause further movement of said primary word space key means to actuate said supplemental word space key means.

10. In combination with a typewriter having a carriage, type keys, word space key means and a uniformly operable escapement controlled main drive mechanism for said carriage providing uniform type spacing on actuation of the type keys and uniform word spacing on actuation of the word space key means, supplemental means for transmitting movement of said word space key means to cause supplemental movement of the carriage, clutch means actuated by said movement of said space key means to engage said supplemental motion transmitting means to impart compensating movement to said carriage to adjust the spaces between words by supplemental amounts for accurate justification and means for adjusting the movement of said space key means.

11. In combination with a typewriter having a movable platen carrying carriage, type key means and word space key means and a uniformly operable escapement controlled main drive mechanism for said carriage providing uniform type spacing on actuation of the type keys and uniform word spacing on actuation of the word space key means, means for transmitting movement of said word space key means to cause movement of the carriage normally permitting its zero return movement, and clutch means actuated by said movement of said space key means to engage said motion transmitting means to impart compensating movement to said carriage to adjust the spaces between words by amounts requisite for accurate justification.

12. In combination with a typewriter having a carriage, type keys, at least one word space key and a uniformly operable escapement controlled main drive mechanism for said carriage providing uniform type spacing on actuation of the type keys and uniform word spacing on actuation of the word space key, supplemental means for transmitting movement of a word space key to said carriage through said escapement controlled main drive mechanism to cause supplemental movement of the carriage without interfering with its main escapement controlled drive mechanism movement and zero return movement and means for adjusting the movement of said last-mentioned space key to vary the movement imparted by said supplemental means to adjust the spaces between words by supplemental amounts for accurate justification.

13. In a typewriter having a movable platen carrying carriage, type key means and a word space key, a spring actuated feeding device actuated by movement of said type key means and word space key, a supplemental word space key, a justifying device actuated by movement of said supplemental word space key constructed to add to any desired number of the word spaces of a line the entire variation space for accurate justification, and a controller for regulating the movement of said supplemental space key to control the movement imparted to the justifying device whereby said space may be divided into any desired number of equal parts.

14. In a typewriter having a movable platen carrying carriage, type key means and at least one word space key, a spring actuated feeding device actuated by movement of said type key means and a word space key, a justifying device actuated by movement of said word space key constructed to add to any desired number of the word spaces of a line the entire variation space for accurate justification, and a controller for regulating the movement of said last-mentioned word space key to control the movement imparted to the justifying device whereby said space may be divided into any desired number of equal parts.

15. In a typewriter, a frame, a platen carrying carriage laterally movable on said frame having a finger projecting therefrom, a laterally movable supplemental carriage having toothed means and spaced bracket means projecting therefrom, spring means attached to said frame and said supplemental carriage for advancing said supplemental carriage, an escapement mechanism for controlling the amount of movement of said supplemental carriage, type keys for actuating said escapement mechanism for imparting uniform motion to said toothed means, vertically movable word space key means, means for transmitting movement of said word space key means to actuate said escapement mechanism for imparting uniform word spacing motion to said toothed means, a rotary shaft mounted on said frame parallel to said toothed means having an axial groove therein, a hollow worm having pin means projecting inwardly thereof registering in said shaft groove to rotate therewith and to slide freely axially thereof mounted on said spaced bracket means against relative axial movement and having a helical groove on the periphery thereof for receiving said finger projecting from the main carriage to impart supplemental lateral movement to said carriage relative to said supplemental carriage on rotation of said worm, stop means on said carriage adapted to abut cooperating stop means on said supplemental carriage to return said supplemental carriage and worm to zero position on lateral return movement of said carriage to zero position, means for transmitting and translating vertical movement of said word space key means to rotary movement of said grooved rotary shaft and releasable clutch means interposed in said motion transmitting and translating means permitting the usual drive and zero return movements of the carriage, toothed means and worm, and means for adjusting the movement of said word space key means.

16. In a typewriter, a frame, a platen carrying carriage laterally movable on said frame having a finger projecting therefrom, a laterally movable supplemental carriage having toothed means and spaced bracket means projecting therefrom, spring means attached to said frame and said supplemental carriage for advancing said supplemental carriage, an escapement mechanism for controlling the amount of movement of said supplemental carriage, type keys for actuating said escapement mechanism for imparting uniform motion to said toothed means, vertically movable word space key means, means for transmitting movement of said word space key means to actuate said escapement mechanism for imparting uniform word spacing motion to said toothed means, a rotary shaft mounted on said frame parallel to said toothed means having an axial groove therein, a hollow worm having pin means projecting inwardly thereof registering in said shaft groove to rotate therewith and to slide freely axially thereof mounted on said spaced bracket means against relative axial movement and having a helical groove on the periphery thereof for receiving said finger projecting from the main carriage to impart supplemental lateral movement to said carriage relative to said supplemental carriage on rotation of said worm, stop means on said carriage adapted to abut cooperating stop means on said supplemental carriage to return said supplemental carriage and worm to zero position on lateral return movement of said carriage to zero position, means for transmitting and translating vertical movement of said word space key means to rotary movement of said grooved rotary shaft, and means for adjusting the movement of said word space key means.

17. In a typewriter, a frame, a platen carrying carriage laterally movable on said frame having a finger projecting therefrom, a laterally movable supplemental carriage having toothed means and spaced bracket means projecting therefrom, vertically movable word space key means, a rotary shaft mounted on said frame parallel to said toothed means having an axial groove therein, a hollow worm having pin means projecting inwardly thereof registering in said shaft groove to rotate therewith and to slide freely axially thereof mounted on said spaced bracket means against relative axial movement and having a helical groove on the periphery thereof for receiving said finger projecting from the main carriage to impart supplemental lateral movement to said carriage relative to said supplemental carriage on rotation of said worm, stop means on said carriage adapted to abut cooperating stop means on said supplemental carriage to return said supplemental carriage and worm to zero position on lateral return movement of said carriage to zero position, means for transmitting and translating vertical movement of said word space key means to rotary movement of said grooved rotary shaft, releasable clutch means interposed in said motion transmitting and translating means permitting the usual drive and zero return movements of the carriage, toothed means and worm, and means for adjusting the movement of said word space key means.

18. In a typewriter, a frame, a platen carrying carriage laterally movable on said frame having a finger projecting therefrom, a laterally movable supplemental carriage having toothed means and spaced bracket means projecting therefrom, vertically movable word space key means, a rotary shaft mounted on said frame parallel to said toothed means having an axial groove therein, a hollow worm having pin means projecting inwardly thereof registering in said shaft groove to rotate therewith and to slide freely axially thereof mounted on said spaced bracket means against relative axial movement and having a helical groove on the periphery thereof for receiving said finger projecting from the main carriage to impart supplemental lateral movement to said carriage relative to said supplemental carriage on rotation of said worm, stop means on said carriage adapted to abut cooperating stop means on said supplemental carriage to return said supplemental carriage and worm to zero position on lateral return movement of said carriage to zero position, means for transmitting and translating vertical movement of said word space key means to rotary movement of said grooved rotary shaft, and means for adjusting the movement of said word space key means.

19. In a typewriter, a frame, a main platen carrying carriage laterally movable on said frame, a laterally movable toothed supplemental carriage mounted on said frame, an escapement mechanism for actuating said movable toothed carriage, type keys for actuating said escapement mechanism for imparting uniform motion to said toothed carriage, word space key means, means for transmitting movement of said word space key means to actuate said escapement mechanism for imparting uniform word spacing motion to said toothed carriage, a housing, a shaft revolvably mounted in the walls of said housing, a substantially quadrant shaped cover for said housing having sets of pin receiving hole setting means thereon, said setting means in each set being circumferentially aligned and equally spaced in proportion to successive integral fractions of spaces needed to justify and type employed, said sets being spaced from each other axially of said shaft and each successively comprising fractions of successive numbers of spaces needed to justify, a relatively large gear rigidly mounted on said shaft, bracket means loosely mounted on said shaft, a pinion mounted on said bracket means in mesh with said large gear capable of circumferential movement thereover on relative movement of said bracket means, a sleeve independently loosely mounted on said shaft having aligned fin means projecting radially therefrom longitudinally thereof, and arm means also projecting integrally therefrom actuated by said word space key means, said bracket means and arm means having a projection from one of said means projecting axially into a circumferential slot in the other, said arm means having pawl means projecting axially therefrom movable from zero position into a pinion tooth on relative movement of said arm means to cause rotative movement of said shaft, spring means normally urging said sleeve, arm means and pawl to zero position, and stop means projecting from said housing to abut said projection to insure that said spring means moves said pawl from said pinion substantially at the end of the zero return movement of said arm means to permit independent rotation of said large gear shaft and pinion on zero return of said shaft, and spring means also acting on said projection to move said bracket means relatively to said arm means to cause immediate registration of said pawl in said pinion on movement of said arm means from zero position, means to transmit and translate rotative movement of said shaft into lateral movement of said supplemental carriage, said supplemental carriage being connected to said main carriage to permit uniform forward movement thereof on actuation of said escapement mechanism and zero return movement thereof, and pin means adapted to be mounted in a selected hole to abut said fin means to vary the movement of said shaft.

20. In a typewriter, a frame, a main platen carrying carriage laterally movable on said frame, a laterally movable toothed supplemental carriage mounted on said frame, an escapement mechanism for actuating said movable toothed carriage, type keys for actuating said escapement mechanism for imparting uniform motion to said toothed carriage, word space key means, means for transmitting movement of said word space key means to actuate said escapement mechanism for imparting uniform word spacing motion to said toothed carriage, a housing, a shaft revolvably mounted in the walls of said housing, a substantially quadrant shaped cover for said housing having sets of setting means thereon, said setting means in each set being circumferentially aligned and equally spaced in proportion to successive integral fractions of spaces needed to justify and type employed, said sets being spaced from each other axially of said shaft and each successively comprising fractions of successive numbers of spaces needed to justify, a relatively large gear rigidly mounted on said shaft, bracket means loosely mounted on said shaft, a pinion mounted on said bracket means in mesh with said large gear capable of circumferential movement thereover on relative movement of said bracket means, a sleeve independently loosely mounted on said shaft having aligned fin means projecting radially therefrom longitudinally thereof, and arm means also projecting integrally therefrom actuated by said word space key means, said bracket means and arm means having a projection from one of said means projecting axially into a circumferential slot in the other, said arm means having pawl means projecting axially therefrom movable from zero position into a pinion tooth on relative movement of said arm means to cause rotative movement of said shaft, spring means normally urging said sleeve, arm means and pawl to zero position, and stop means projecting from said housing to abut said projection to insure that said spring means moves said pawl from said pinion substantially at the end of the zero return movement of said arm means to permit independent rotation of said large gear shaft and pinion on zero return of said shaft, and spring means also acting on said projection to move said bracket means relatively to said arm means to cause immediate registration of said pawl in said pinion on movement of said arm means from zero position, means to transmit and translate rotative movement of said shaft into lateral movement of said supplemental carriage, said supplemental carriage being connected to said main carriage to permit uniform forward movement thereof on actuation of said escapement mechanism and zero return movement thereof.

21. In a typewriter, a frame, a main platen carrying carriage laterally movable on said frame, a laterally movable supplemental carriage mounted on said frame, word space key means, a housing, a shaft revolvably mounted in said housing, a substantially quadrant shaped cover for said housing having sets of pin receiving hole setting means thereon, said setting means in each set being circumferentially aligned and equally spaced in proportion to successive integral fractions of spaces needed to justify, said sets being spaced from each other axially of said shaft and each successively comprising fractions of successive numbers of spaces needed to justify, a relatively large gear rigidly mounted on said shaft, bracket means loosely mounted on said shaft, a pinion mounted on said bracket means in mesh with said large gear capable of circumferential movement thereover on relative movement of said bracket means, a sleeve independently loosely mounted on said shaft having aligned fin means projecting radially therefrom longitudinally thereof, and arm means also projecting integrally therefrom actuated by said word space key means, said bracket means and arm means having a projection from one of said means projecting axially into a circumferential slot in the other, said arm means having pawl means projecting axially therefrom movable from zero position into a pinion tooth on relative movement of said arm means to cause rotative movement of said shaft, spring means normally urging said sleeve, arm means and pawl to zero position, and stop means projecting from said housing to abut said projection to insure that said spring means moves said pawl from said pinion substantially at the end of the zero return movement of said arm means to permit independent rotation of said large gear shaft and pinion on zero return of said shaft, and spring means also acting on said projection to move said bracket means relatively to said arm means to cause immediate registration of said pawl in said pinion on movement of said arm means from zero position, means to transmit and translate rotative movement of said shaft into lateral movement of said supplemental carriage, said supplemental carriage being connected to said carriage to permit forward movement thereof and zero return movement thereof, and pin means adapted to be mounted in a selected hole to abut said fin means to vary the movement of said shaft.

22. In a typewriter, a frame, a main platen carrying carriage laterally movable on said frame, a laterally movable supplemental carriage mounted on said frame, word space key means, a housing, a shaft revolvably mounted in the walls of said housing, a substantially quadrant shaped cover for said housing having sets of setting means thereon, said setting means in each set being circumferentially aligned and equally spaced in proportion to successive integral fractions of spaces needed to justify, said sets being spaced from each other axially of said shaft and each successively comprising fractions of successive numbers of spaces needed to justify, a relatively large gear rigidly mounted on said shaft, bracket means loosely mounted on said shaft, a pinion mounted on said bracket means in mesh with said large gear capable of circumferential movement thereover on relative movement of said bracket means, a sleeve independently loosely mounted on said shaft having aligned fin means projecting radially therefrom longitudinally thereof, and arm means also projecting integrally therefrom actuated by said word space key means, said bracket means and arm means having a projection from one of said means projecting axially into a circumferential slot in the other, said arm means having pawl means projecting axially therefrom movable from zero position into a pinion tooth on relative movement of said arm means to cause rotative movement of said shaft, spring means normally urging said sleeve, arm means and pawl to zero position, and stop means projecting from said housing to abut said projection to insure that said spring means moves said pawl from said pinion substantially at the end of the zero return movement of said arm means to permit independent rotation of said large gear shaft and pinion on zero return of said shaft, and spring means also acting on said projection to move said bracket means relatively to said arm means to cause immediate registration of said pawl in said pinion on movement of said arm means from zero position, means to transmit and translate rotative movement of said shaft into lateral movement of said supplemental carriage, said supplemental carriage being connected to said carriage to permit uniform forward movement thereof on actuation of said escapement mechanism and zero return movement thereof.

23. In a typewriter, a frame, a main platen carrying carriage laterally movable on said frame, a laterally movable supplemental carriage mounted on said frame, word space key means, a housing, a shaft revolvably mounted in the walls of said housing, a substantially quadrant shaped cover for said housing having setting means thereon spaced from each other axially of said shaft, a relatively large gear rigidly mounted on said shaft, bracket means loosely mounted on said shaft, a pinion mounted on said bracket means in mesh with said large gear capable of circumferential movement thereover on relative movement of said bracket means, a sleeve independently loosely mounted on said shaft having aligned fin means projecting radially therefrom longitudinally thereof, and arm means also projecting integrally therefrom actuated by said word space key means, said bracket means and arm means having a projection from one of said means projecting axially into a circumferential slot in the other, said arm means having pawl means projecting axially therefrom movable from zero position into a pinion tooth on relative movement of said arm means to cause rotative movement of said shaft, spring means normally urging said sleeve, arm means and pawl to zero position, and stop means projecting from said housing to abut said projection to insure that said spring means moves said pawl from said pinion substantially at the end of the zero return movement of said arm means to permit independent rotation of said large gear shaft and pinion on zero return of said shaft, and spring means also acting on said projection to move said bracket means relatively to said arm means to cause immediate registration of said pawl in said pinion on movement of said arm means from zero position, means to transmit and translate rotative movement of said shaft into lateral movement of said supplemental carriage, said supplemental carriage being connected to said carriage to permit uniform forward movement thereof on actuation of said escapement mechanism and zero return movement thereof.

24. A substantially quarter cylindrical housing cover having sets of pin receiving hole setting means thereon, said setting means in each set being circumferentially aligned and circumferentially equally spaced in proportion to successive integral fractions of spaces needed to justify and type employed, said sets being axially spaced from each other and each successively comprising fractions of successive numbers of spaces needed to justify.

25. A substantially quarter cylindrical housing cover having sets of setting means thereon, said setting means in each set being circumferentially aligned and circumferentially equally spaced in proportion to successive integral fractions of spaces needed to justify and type employed, said sets being axially spaced from each other and each successively comprising fractions of successive numbers of spaces needed to justify.

26. A substantially quarter cylindrical housing cover having sets of setting means thereon, said setting means in each set being circumferentially aligned and circumferentially equally spaced in proportion to successive integral fractions of spaces needed to justify, said sets being axially spaced from each other and each successively comprising fractions of successive numbers of spaces needed to justify.

27. A housing, a shaft revolvably mounted in the walls of said housing, a substantially quadrant shaped cover for said housing having sets of pin receiving hole setting means thereon, said setting means in each set being circumferentially aligned and equally spaced in proportion to successive integral fractions of spaces needed to justify and type employed, said sets being spaced from each other axially of said shaft and each successively comprising fractions of successive numbers of spaces needed to justify, a relatively large gear rigidly mounted on said shaft, bracket means loosely mounted on said shaft, a pinion mounted on said bracket means in mesh with said large gear capable of circumferential movement thereover on relative movement of said bracket means, a sleeve independently loosely mounted on said shaft having aligned fin means projecting radially therefrom longitudinally thereof, and arm means also projecting integrally therefrom, said bracket means and arm means having a projection from one of said means projecting axially into a circumferential slot in the other, said arm means having pawl means projecting axially therefrom movable from zero position into a pinion tooth on relative movement of said arm means to cause rotative movement of said shaft, spring means normally urging said sleeve, arm means and pawl to zero position, and stop means projecting from said housing to abut said projection to insure that said spring means moves said pawl from said pinion substantially at the end of the zero return movement of said arm means to permit independent rotation of said large gear shaft and pinion on zero return of said shaft, and spring means also acting on said projection to move said bracket means relatively to said arm means to cause immediate registration of said pawl in said pinion on movement of said arm means from zero position.

28. A housing, a shaft revolvably mounted in the walls of said housing, a substantially quadrant shaped cover for said housing having setting means thereon spaced from each other axially of said shaft, a relatively large gear rigidly mounted on said shaft, bracket means loosely mounted on said shaft, a pinion mounted on said bracket means in mesh with said large gear capable of circumferential movement thereover on relative movement of said bracket means, a sleeve independently loosely mounted on said shaft having aligned fin means projecting radially therefrom longitudinally thereof, and arm means also projecting integrally therefrom, said bracket means and arm means having a projection from one of said means projecting axially into a circumferential slot in the other, said arm means having pawl means projecting axially therefrom movable from zero position into a pinion tooth on relative movement of said arm means to cause rotative movement of said shaft, spring means normally urging said sleeve, arm means and pawl to zero position, and stop means projecting from said housing to abut said projection to insure that said spring means moves said pawl from said pinion substantially at the end of the zero return movement of said arm means to permit independent rotation of said large gear shaft and pinion on zero return of said shaft, and spring means also acting on said projection to move said bracket means relatively to said arm means to cause immediate registration of said pawl in said pinion on movement of said arm means from zero position.

29. In combination with a typewriter having a carriage, type keys, primary word space key means and a uniformly operable escapement controlled main drive mechanism for said carriage providing uniform type spacing on actuation of the type keys and uniform word spacing on actuation of the word space key means, supplemental word space key means, means for transmitting movement of said supplemental word space key means to cause supplemental movement of the carriage, clutch means actuated by said movement of said supplemental space key means to engage said motion transmitting means to impart compensating movement to said carriage to adjust the spaces between words by supplemental amounts for accurate justification, means for adjusting the movement of said supplemental space key means, and means to detachably connect said supplemental word space key means to said primary word space key means to cause supplemental movement of said primary word space key means to actuate said supplemental word space key means.

30. In combination with a typewriter having a carriage, type keys, primary word space key means and a uniformly operable escapement controlled main drive mechanism for said carriage providing uniform type spacing on actuation of the type keys and uniform word spacing on actuation of the word space key means, supplemental word space key means, means for transmitting movement of said supplemental word space key means to cause supplemental movement of the carriage, clutch means actuated by said movement of said supplemental space key means to engage said motion transmitting means to impart compensating movement to said carriage to adjust the spaces between words by supplemental amounts for accurate justification, means for adjusting the movement of said supplemental space key means, and means to detachably connect said supplemental word space key means to said primary word space key means to cause movement of said primary word space key means to actuate sad supplemental word space key means.

31. In combination with a typewriter having a carriage, type keys, primary word space key means and a uniformly operable escapement controlled main drive mechanism for said carriage providing uniform type spacing on actuation of the type keys and uniform word spacing on actuation of the word space key means, supplemental word space key means, means for transmitting movement of said supplemental word space key means to cause supplemental movement of the carriage, means for adjusting the movement of said supplemental space key means, and means to detachably connect said supplemental word space key means to said primary word space key means to cause movement of said primary word space key means to actuate said supplemental word space key means.

32. In combination with a typewriter having a carriage, type keys, pivotally mounted primary word space key means and a uniformly operable escapement controlled main drive mechanism for said carriage providing uniform type spacing on actuation of the type keys and uniform word spacing on initial actuation of the word space key means, supplemental pivotally mounted word space key means, means for transmitting movement of said supplemental word space key means to cause supplemental movement of the carriage, means for adjusting the movement of said supplemental space key means, and means to detachably connect said pivotally mounted supplemental word space key means to said pivotally mounted primary word space key means to cause further movement of said primary word space key means to actuate said supplemental word space key means.

EDWARD N. ROBINSON, Jr.
HENRY W. KRUKAU.